US007356332B2

(12) United States Patent
Pell et al.

(10) Patent No.: US 7,356,332 B2
(45) Date of Patent: Apr. 8, 2008

(54) MOBILE INFORMATION SYSTEM FOR PRESENTING INFORMATION TO MOBILE DEVICES

(75) Inventors: Mike Pell, Woodinville, WA (US); Charles L. Friedman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 10/715,944

(22) Filed: Nov. 18, 2003

(65) Prior Publication Data

US 2004/0248588 A1    Dec. 9, 2004

Related U.S. Application Data

(60) Provisional application No. 60/477,410, filed on Jun. 9, 2003.

(51) Int. Cl.
*H04M 3/42* (2006.01)
*H04Q 7/22* (2006.01)
*H04Q 7/38* (2006.01)

(52) U.S. Cl. ............... 455/414.1; 455/414.2; 455/456.1; 715/744; 715/745; 715/746; 715/747

(58) Field of Classification Search .. 455/414.1–414.2, 455/456.1; 715/744–747
See application file for complete search history.

(56) References Cited

U.S. PATENT DOCUMENTS

| 5,987,480 | A | * | 11/1999 | Donohue et al. | ........ 715/501.1 |
| 6,216,121 | B1 | * | 4/2001 | Klassen | .................. 707/1 |
| 6,278,449 | B1 | * | 8/2001 | Sugiarto et al. | ............ 715/826 |
| 6,535,749 | B1 | | 3/2003 | Iwata | |
| 6,760,046 | B2 | * | 7/2004 | I'Anson et al. | ............. 715/746 |
| 6,782,253 | B1 | * | 8/2004 | Shteyn et al. | ............ 455/414.1 |
| 6,836,727 | B2 | * | 12/2004 | Kunigita | ............... 701/208 |
| 2001/0014615 | A1 | * | 8/2001 | Dahm et al. | ................ 455/566 |
| 2002/0013735 | A1 | * | 1/2002 | Arora et al. | .................. 705/26 |

(Continued)

FOREIGN PATENT DOCUMENTS

EP    1032185 A2    8/2000

(Continued)

OTHER PUBLICATIONS

Interface Culture—How New Technology Transforms The Way We Create And Communicate Steven Johnson Copyright 1997 Book pp. 1 through 264 (137 pages total).

(Continued)

*Primary Examiner*—William Trost
*Assistant Examiner*—Ariel Balaoing
(74) *Attorney, Agent, or Firm*—Workman Nydegger

(57) ABSTRACT

Mobile communications devices display contextually relevant information based on the presence, status, and identification of a user. Lens templates control how the information is displayed and can be customized and designed for specific usage profiles. The lenses that are used can be updated at any time to accommodate changes in a user's presence. The granularity of the lenses and corresponding information can also vary to accommodate different needs and preferences. Lenses can also be specialized for different events or venues. The lenses allow a user to access contextually relevant information from a mobile communications device having limited display and/or browse capabilities without requiring a user to navigate through undesired information, wasting valuable resources in the process.

18 Claims, 6 Drawing Sheets

U.S. PATENT DOCUMENTS

| | | | |
|---|---|---|---|
| 2002/0029267 A1* | 3/2002 | Sankuratripati et al. | 709/224 |
| 2002/0133545 A1* | 9/2002 | Fano et al. | 709/203 |
| 2003/0043191 A1* | 3/2003 | Tinsley et al. | 345/762 |
| 2003/0046541 A1* | 3/2003 | Gerdes et al. | 713/168 |
| 2004/0117383 A1* | 6/2004 | Lee et al. | 707/100 |
| 2004/0235463 A1* | 11/2004 | Patel | 455/418 |
| 2006/0019716 A1 | 1/2006 | Pell | |
| 2006/0025108 A1 | 2/2006 | Pell | |

FOREIGN PATENT DOCUMENTS

| | | |
|---|---|---|
| EP | 1202188 A2 | 5/2002 |
| WO | WO 00/39666 | 7/2000 |
| WO | WO 02/076058 | 9/2002 |

OTHER PUBLICATIONS

"HDML 2.0 Language Reference Version 2.0" Unwired Planet, Inc., Redwood Shores, CA, Jul. 1997, pp. 1-56.

Office Action mailed Oct. 9, 2007 cited in related U.S. Appl. No. 11/227/758.

* cited by examiner

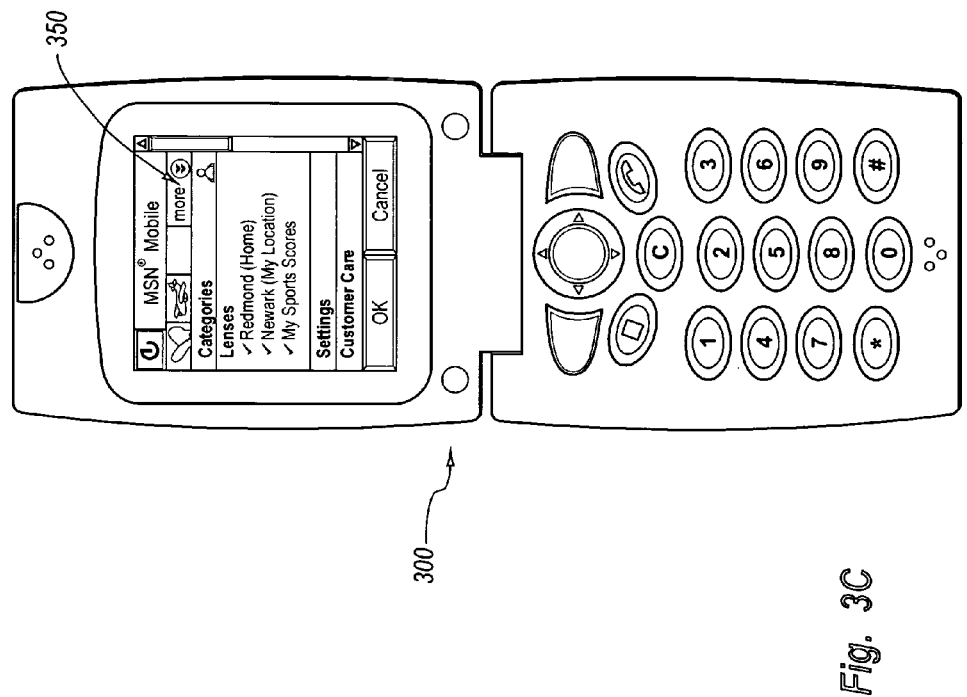
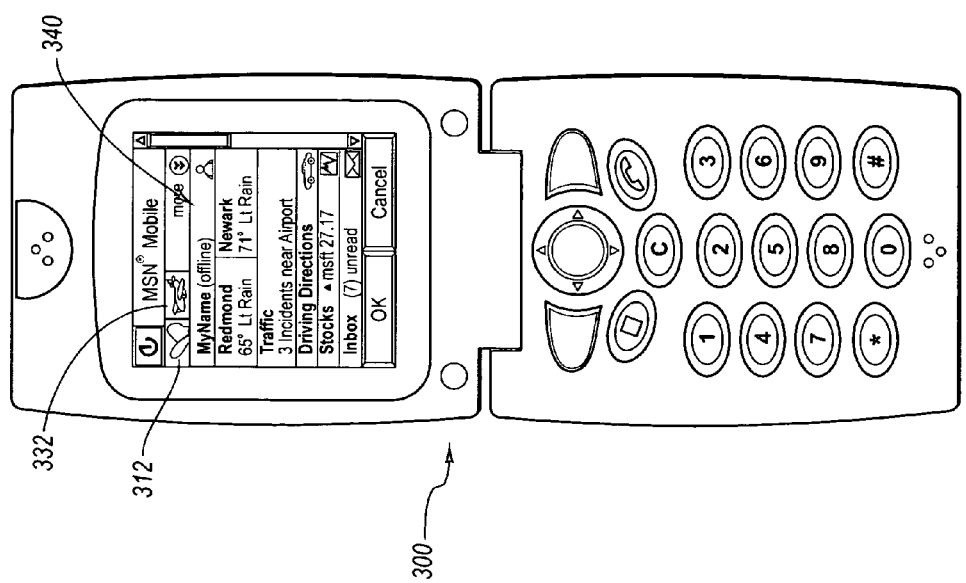
Fig. 3D
Fig. 3C

MOBILE INFORMATION SYSTEM FOR PRESENTING INFORMATION TO MOBILE DEVICES

CROSS REFERENCE TO RELATED APPLICATIONS

The present application claims the benefit and priority of provisional U.S. patent No. 60/477,410, filed Jun. 9, 2003, entitled "MobileLens," and which is incorporated herein by reference.

BACKGROUND OF THE INVENTION

1. The Field of the Invention

The present invention relates to the field of information services available via mobile communications links and, more particularly, to improvements in delivering and presenting information to mobile communications devices.

2. Background and Relevant Art

In the telecommunications industry, several advances have been made to facilitate the convergence of computing and telephone capabilities. For example, it is now common for mobile telephones and other mobile communications devices to be equipped with displays and browsers to enable access to the Internet and other network repositories.

The utility of such a communications device is well appreciated. For example, such devices can enable a user to access their email or other messages, even while they are traveling. Other information, such as, but not limited to, financial reports, weather, sporting reports and news can also be accessed on a mobile communications device while a person is traveling, such as, for example, by using the mobile communications device to connect to the Internet or other available networks.

Although the ability to access information remotely and on the move can be advantageous, for at least the reasons mentioned above, the portability of some mobile communications devices inherently limits the display and navigation capabilities for presenting the information that is obtained. In particular, the size constraints of some mobile telephones and PDAs can restrict the amount of information that can be properly displayed at any given time. For example, existing mobile communications devices can typically only display a relatively limited amount of information as compared to, for example, a desktop computer monitor. Accordingly the amount of information and the type of information that is displayed on a mobile communications device is restricted to the browser and display capabilities of the mobile communications device, rather than on the preferences of the user or the relevance of the information that is be displayed at any particular time.

To help overcome some of these limitations, a user can utilize an Internet service, such as Microsoft's MSN Mobile, to customize a PC-based webpage to help focus and control the presentation of information that is accessed and displayed by the mobile communications device when the mobile webpage is accessed. For example, a PC-based personalized webpage can enable a user to select various types of news reports, financial reports, sporting reports, weather reports, and other information that they want to be presented when they access their personalized mobile webpage. By doing this, a user can have some control over the information that is presented on their mobile communications device. However, because of the restrictive display and browse capabilities of the mobile communications devices, as described above, the presentation of the desired information can still be presented in some unsatisfying or undesired way.

Furthermore, because people traditionally use telephones differently than they use their computers, users may not want to access the same information on their telephones as they do on their computer. Accordingly, a customized webpage that is intended for computer web access can include more information than a person wishes to access or navigate through on their telephone. This is particularly true when considering that accessing Internet information over a telephone can sometimes cost a user more than the same access on a computer, depending on the user's phone plan.

Yet another reason why a user may wish to access different information with their telephone than they do with their computer is because most telephone devices do not have the advanced navigation affordances that are provided by most computers, such as, for example, full size keyboards, and so forth.

Accordingly, although the ability to access information through a mobile communications device can be useful, it is not always practical or desirable to access information on a mobile device in the same way as on a traditional computer. Instead, it is typically more desirable to access more focused and relevant information so that a user does not have to waste valuable time and resources (e.g., power resources) trying to find desired information. This is even more true when a user is traveling between cities, states, or even countries, because the information they are seeking may be contextually relevant only to the location or time in which they are seeking the information. Therefore, what is needed in the industry are improved methods and systems for presenting information for mobile communications devices in desirable and contextually relevant ways.

BRIEF SUMMARY OF THE INVENTION

The present invention relates to methods, systems and computer-program products for presenting information to mobile communications devices in a desirable manner.

According to one embodiment, the information that is presented at a user's mobile communication device is contextually based upon the location of the mobile communications device, the identity of the user, the time of day the information is accessed, suggestions based upon aggregated information-based web portal usage statistics, personal and other related status and presence information.

To facilitate the manner in which information is presented, various different template-like lenses are utilized that control the presentation of information displayed on the mobile communications devices. For example, different lenses for different geographic and demographic applications can be provided that present contextually relevant information based upon user status, presence, and preference. A user can even build and utilize different customized lenses to accommodate their particular needs and desires.

The granularity of the lenses can vary to accommodate various needs and preferences. For example, geographic lenses can be based on communities, cities, states, nationalities, as well as any other identifiable geography. Lenses can also be specialized for different venues, such as sporting venues, recreational venues, educational venues, work venues, national parks, amusement parks, and so forth. Although the mobile communications service can automatically update lenses based upon contextual status and presence information, it will also be appreciated that a user can also specify particular preferences or make special requests for particular information in customizable lenses, as described herein.

In one embodiment, the lenses are designed to accommodate various profiles that are developed from aggregate computer and telephone usage data. In particular, usage profiles can be developed to identify the preferences for certain users to access certain types of data based upon their classified profiles. The profiles can be based on both how users utilize their computers as well as how they utilize their telephones. Thereafter, the profiles can be used to develop or customize lenses to provide the information that is desired by a user at their mobile communications device and in a desired manner.

It will be appreciated that in the foregoing manner, it is possible to dynamically provide users with desired and updated information at mobile communications devices and in a contextually relevant manner, so that the information is time sensitive and relevant to the user's identified preferences, locations and activities. Providing information to mobile communications devices in this manner can also improve the speed in which a user can obtain information after it has been requested. In particular, information can be automatically pushed to a user's mobile communications device, based on the user's presence and status data, and subsequently cached on the mobile communications device until the user actually makes a request for the information, substantially improving the usability and user experience of mobile information service.

Alternatively, the information can be automatically presented upon determining the appropriate lens to use for the presentation of the information, based upon contextually relevant or default settings.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3a-3e illustrates various embodiments of a mobile communications device displaying different information in different formats.

DETAILED DESCRIPTION OF THE PREFERRED EMBODIMENTS

Figure 1:
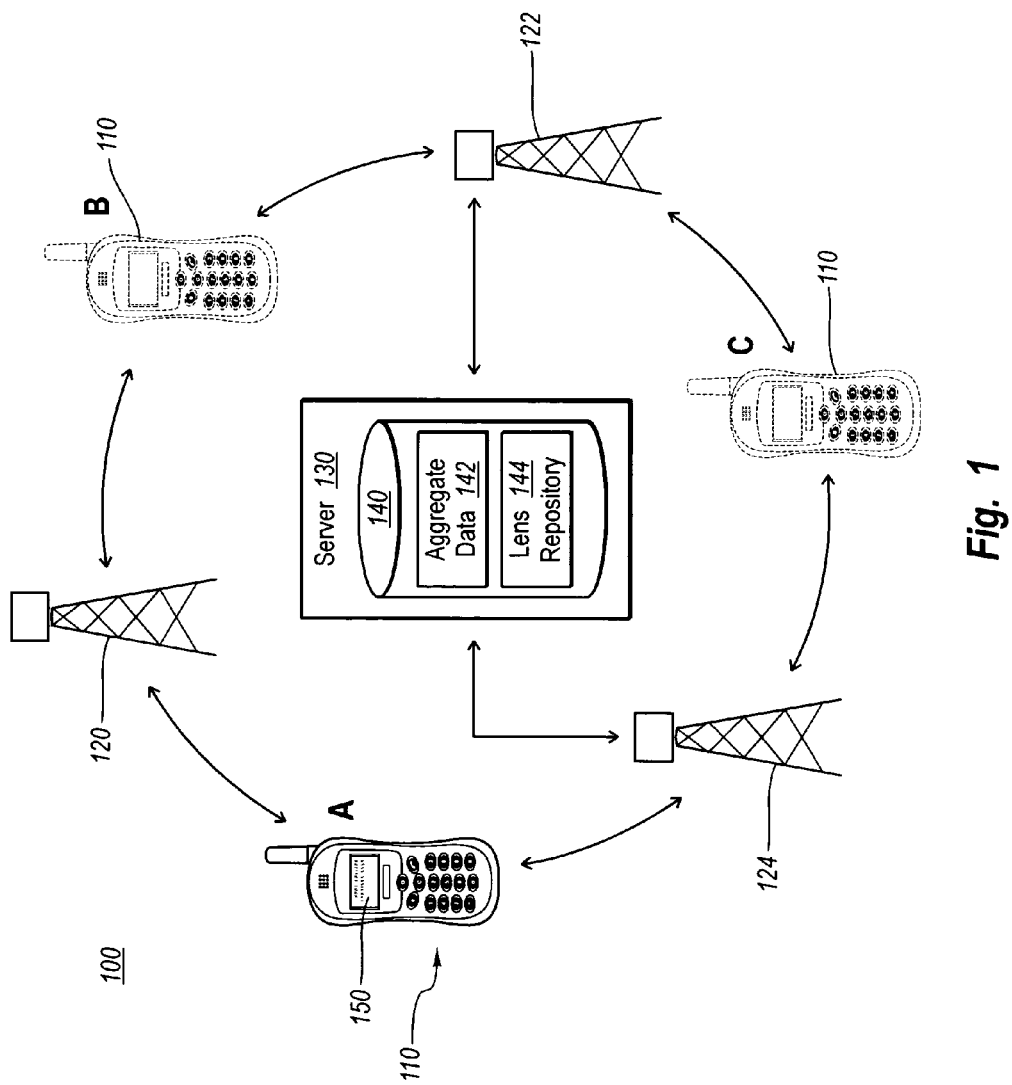
FIG. 1 illustrates one embodiment of a network in which a mobile communications device can receive information from an information source based on contextually relevant data, such as the presence and status of the mobile communications device.

The present invention extends to methods, systems and computer-program products for presenting information at mobile communications devices and in a contextually relevant manner.

The contextual information that is used to control how information is presented at mobile communications devices is sometimes referred to herein as "status data". In this regard, "status data" can refer to both the presence of a mobile communications device, as well as the designation of a user that is associated with the mobile communications device (e.g., an identified user or an anonymous user).

It will be appreciated that the term "presence," can refer to both a physical location as well as a temporal state (e.g., time of use). It should also be appreciated that references that are made to a user's presence should generally also be construed as applying to the presence of the user's mobile communications device.

The term "mobile communications device," as defined herein, generally refers to mobile telephone devices, PDAs, and other portable computing devices. In one embodiment, the mobile communications device includes an IEEE 802.11 transceiver (i.e., a WiFi transceiver) and a rich client application that can identify itself to a mobile data center, or information source. In another embodiment, the mobile communications device is a cellular telephone device that can be identified by a telephone number or MSISDN.

In various embodiments described herein, lenses (views) or templates are used to control what information is presented and how it is presented. These lenses generally comprise user interfaces that can be created, modified and used through computer software components, which are sometimes referred to herein as computer-executable instructions and computing modules.

Accordingly, the embodiments of the invention can include special purpose and general-purpose computing devices including various computer software and hardware. The embodiments within the scope of the present invention can also include computer-readable media for carrying or having the computer-executable instructions or data structures stored thereon.

It will be appreciated that the computer-readable media can be any available media that can be accessed by a general purpose or special purpose computer, including, but not limited to mobile communications devices. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. The computer-executable instructions comprise, for example, instructions and data which cause a general purpose computer, special purpose computer, or special purpose processing device to perform a certain function or group of functions, such as the acts and steps described below.

When information is transferred or provided over a network or another communications connection (either hardwired, wireless, or a combination of hardwired or wireless) to a computer or mobile communications device, the computer/device properly views the connection as a computer-readable medium. Thus, any such connection is properly termed a computer-readable medium. Combinations of the above should also be included within the scope of computer-readable media.

FIG. 1 illustrates one example of a network 100 in which embodiments of the invention can be practiced. As shown, the network 100 includes a mobile communications device 110, a plurality of communication nodes 120, 122, 124, and an information source 130.

The mobile communications device is presently illustrated as having the form factor of a wireless telephone. It will be appreciated, however, that the invention is not necessarily limited to only embodiments in which the mobile communications device comprises a wireless telephone device. For example, in other embodiments, the mobile communications device can comprise a PDA or portable computer.

As described herein, the mobile communications device receives and displays contextually relevant information based on such things as location, a user designation, and time. The location can be determined, for example, through an Assisted GPS system, E911 system or other positioning system. The location of the mobile communications device can be determined by or published to the information source 130 that is providing information to the mobile communications device.

The server 130 is able to provide desired information to the mobile communications device through one or more network communication nodes, such as nodes 120, 122 and 124. Although the nodes 120, 122 and 124 are presently shown as telephone towers, it will be appreciated that the mobile communications device can be communicably connected to the information source 130 through any combination of wireless links, hardwired links, distributed networks and intermediary devices.

According to one preferred embodiment, the network 100 includes at least enough communication nodes to enable communication between the mobile communications device 110 and the information source 130 even when the mobile communications device 110 is moved from one location to another, such as between locations A, B and C.

The information source 130 is presently illustrated as a single object having a single local repository 140. It will be appreciated, however, that the information source 130 can actually comprise a distributed network having multiple local or remote repositories. Accordingly, the illustrated aggregate data 142 and lens repository 144, which are shown to be located within repository 140, can actually be distributed between and disposed in any combination of local and remote storage locations.

It will also be appreciated that the information source 130 includes various modules, which are not illustrated, for enabling communication with the mobile communications device 110, such as, for example to identify the contextual relevant information that is be used to determine the appropriate lenses for use in presenting information to a user at a mobile communications device.

In particular, as described herein, the mobile communications device 110 receives contextually relevant information from an information source and displays the information, as specified by one or more lenses that have been specifically designed for displaying information at the mobile communications device 110. Although the information displayed at the mobile communications device can be visual, such as can be displayed on display screen 150, it will also be appreciated that the information can be audio information, in which case the information can be presented though an appropriate speaker. Likewise, brail readers can display information by modifying the surface topography of a touch sensitive reader. Accordingly, references that are made herein with regard to displaying information should be broadly construed to include the presentation of information through any suitable presentation device.

Figure 2:
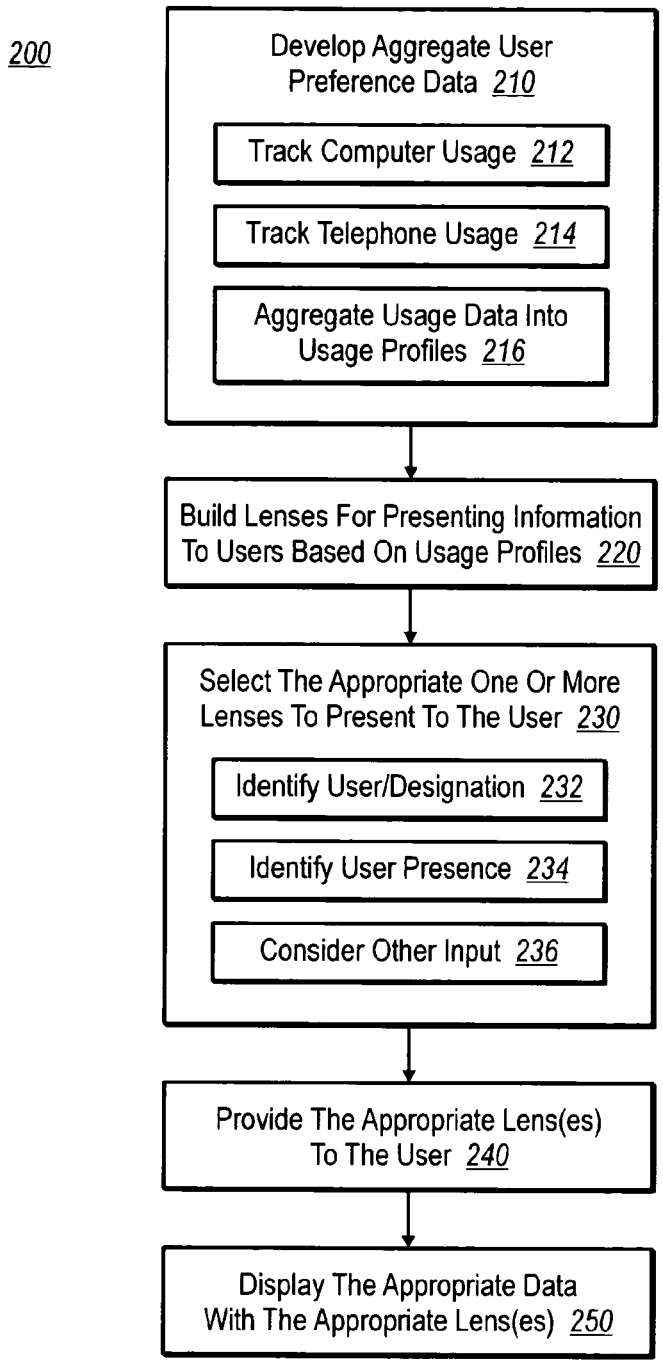
FIG. 2 illustrates a flowchart of various steps and acts that can be executed during implementation of certain methods of the invention for presenting information at mobile communications devices.

Attention will now be directed to FIG. 2, which illustrates a flowchart 200 of one embodiment of a method for presenting information to mobile communications devices. As shown, the method includes various steps and corresponding acts that can be implemented during practice of the invention.

The first illustrated step is to develop aggregate user preference data (step 210) that can be used to develop profiles that can in turn help to provide relevant and desired information to users on mobile communications devices. Because people typically use their telephones or other mobile communications devices in a slightly different manner than they use their traditional computers, it can be useful, although not necessary, to track both standard computer usage (212) and telephone usage (act 214).

The tracked computer usage can include any type of tracked computer usage, including the type of information that users access from any combination of websites and servers, the ways in which personalized webpages are customized, the patterns and types of information that are accessed at different times and as determined by any demographic grouping.

The tracked telephone usage can also apply to any type of information that is accessed through any combination of mobile communications devices by any demographic grouping. Although there are various types of telephone usage that can be tracked, it is not necessary to track the standard phone functions, such as call histories. Rather, the tracked telephone usage is primarily focused on mobile information services utilized by the phone, including, but not limited to, the types of information that is accessed, and the times in which the information is accessed, and the usage patterns for accessing the information.

In one example, a preference engine is used to monitor the types of information people like to access with traditional computers and the types of information the same groups or individual like to access with their telephones or other mobile communications devices.

Correlations can be drawn between the tracked computer and telephone usage data by aggregating the usage data into one or more usage profiles (act 216). The usage profiles can be based on any type of individual or group, accounting for or ignoring any relevant demographic information. The usage profiles can then be associated with particular users, based on their usage profiles, either automatically or by request, and in such a way as to maintain and protect any desired level of the privacy for the individual users.

According to one embodiment, the usage profiles are specifically used to develop one or more corresponding lenses for presenting information to users and in desired formats that accommodate the identified usage profiles (act 220). For example, if it is determined that a particular group uses mobile communications devices to access only basketball scores, email and weather reports from the Internet, then a lens can be developed that will be customized to only present the relevant and desired information that corresponds to that lens, namely, basketball scores, email and weather reports, and in such a way that the group members do not have to track the information down themselves from multiple locations, and thereby preserving resources that would otherwise be required to access and format the information with the mobile communications devices.

The act of building a lens (act 220) can be performed with various programming languages and tools. The lens essentially comprises objects and information that can be presented to a user, such as, for example, with XML a Search Query Lanaguage, or any other appropriate format. Some of the objects and information within the lens definition are static, such as window frames, others are dynamic and can be accessed in response to scripts or other computer-executable instructions that are embedded or attached to the lens, such as HTML links or applets that are executed when the lens is processed by the mobile communications device for display. Because the lenses are configured to present information that can be searched for, they can be thought of in a general sense as a specialized type of search engine that obtains and presents information in a desired and predefined format.

The next illustrated step is to select the appropriate one or more lenses to use for presenting data to a user (step 230). This step can include various corresponding acts, such as, for example, identifying a user or a user designation (act 232), identifying a user presence (act 234), and considering other input (act 236) such as user input.

It can be useful to identify a user designation to determine whether a user is associated with a particular usage profile or if the user has specifically requested certain lenses. In order to identify the user, the user may be prompted for a Passport User Identifier (PUID), Personal Identification Number (PIN), or other information to verify or authenticate a user. Alternatively, a user's mobile communications device can identify a user associated with the device through the telephone number or MSISDN of the telephone. In such embodiments, however, the actual user of the telephone may not be the user that is associated with the telephone.

Accordingly, it will be appreciated that the designation of the user can be either an identified designation or an anonymous designation. Although an identified designation can allow for the presentation of more appropriate lenses and information to a user, the anonymous designation can still be used to select the appropriate one or more lenses to present to the user. In particular, profiles can be developed for anonymous users, based on the aggregate usage data gathered above, that correspond to lenses that are designed to accommodate the desires and interests of anonymous users. These lenses could be subsequently used as the default lens for a new user, so they could benefit from seeing the most popular information among service users.

The presence of the user can also be a relevant factor to consider during the selection of the one or more appropriate lenses. In particular, the time in which the user is using their mobile communications device and the location of the user can relate to the types of information they want to access. For example, users may want to access the weather in the early morning and evening, but may be more concerned with their stock reports and email during the middle of the day. Likewise, if the user is located at a national park or amusement park, they may be more interested in the times/accessibility of certain activities and venues. Yet another example, if someone is located on a highway, they may be concerned with accessing the traffic report for traffic in the direction they are heading. It will be appreciated that the granularity in which the location and presence of a user can be examined and determined can vary significantly to accommodate various needs and preferences.

Likewise, user input and other extemporaneous input can also be considered when selecting lenses. For example, a user can explicitly identify lenses that they would like to use and have applied to their mobile communications device. Users can also build or modify lenses, on their mobile communications devices or through traditional computers. For example, a user can access, build, and or modify a lens from a central repository or a web service, such as provided by MSN Mobile with any computing device. One benefit of enabling a user to modify lenses in such a manner is that they can customize the lenses to best suit their desires and lifestyles. For example, if a businessperson knows they will be traveling to London, Hong Kong and New York on a regular basis, they might want to fine tune existing lenses that correspond to those locations to more closely accommodate the manner in which they would like information presented when they travel.

Other input that may be relevant is the capabilities of the mobile communications device to display the information related to a lens. Accordingly, there may be several variations of a lens to accommodate the various capabilities of different mobile communications devices.

Although the various presence information and other input can be gathered automatically via interaction between the mobile communications device and an information source, it will be appreciated that the manner in which the presence information is collected can also vary to accommodate privacy concerns, logistical constraints, and personal preferences. For example, the methods of the invention can include automatically detecting the presence of a user, based on GPS, E911, or other positioning systems. Alternatively, or additionally, the presence of a user may be based on explicit user input that has to be entered by a user with their mobile communications device.

Upon selecting the appropriate lenses, step 230, the lenses are provided to the user (act 240). According to one embodiment, this occurs through a push paradigm, such that the lenses are automatically provided to the user's device, and without requiring the user to request them. Data can be pushed, for example, via SMS, control channels, a GPRS data channel, MSP, and so forth. It will be appreciated, however, that in some situations it may be desirable to utilize a pull system so that the resources of the user's device are only used in response to an explicit user request.

In some embodiments, the act of providing lenses can be performed objectively through some sort of clearing house and based on the status data gathered regarding the user's identity and presence, as described above. In other embodiments, the lenses are only provided when a user has specifically requested them. In yet other embodiments, third parties, such as friends, can send lenses to users directly without having to involve the information source or clearing house that typically provides the lenses.

Upon receiving a lens, the user may choose to store the lens on their mobile communications device with one or more other lenses for extended periods of time. Alternatively, the user may wish to only temporarily store a lens during its use, after which it will be erased from memory, and so as to preserve memory.

The final act illustrated in flowchart 200 is displaying the appropriate data with the appropriate lenses (act 250). This act, which is performed at the mobile communications device, occurs when the mobile communications device loads and executes the computer-executable instructions incorporated within the lens. It will be appreciated that this can involve the use of various presentation devices, including, but not limited to visual display screens, speakers, and so forth. It should also be appreciated that although the information is displayed at the mobile communications device, the actual rendering processes required to display the information can also occur at a remote device, such as a server. For example, in one embodiment, the client software on the mobile communications device acts as a browser that displays xHTML pages that are processed for display at least in part by the server providing the pages to the mobile communications device.

Although act 250 may include the display of only a single lens, in certain embodiments, act 250 also includes the display of multiple lenses, and even at the same time, as describe in more detail below.

Because the presence of the user can be dynamically updated and appropriate lenses can be continually sent to the user, it will be appreciated that the time it takes to receive the lens can be hidden from the user, inasmuch as the user is not necessarily waiting for the lens if they have not explicitly requested it. Accordingly, when the user does request a lens or for information to be displayed, it can be displayed very quickly, particularly when much or all of it is already cached on the mobile communications device, as can occur in the push paradigm described above.

Attention is now drawn to FIGS. 3A-3E, which illustrate various embodiments of a mobile communications device that is displaying information according to methods of the invention. It will be appreciated that the specific embodiments and examples provided below, with particular regard to the format of the displayed information, the types and styles of the displayed objects and icons, and the granularity of the information, should be construed as merely illustrative, and should not, therefore, be construed as limiting the scope of the invention.

Figure 3B:
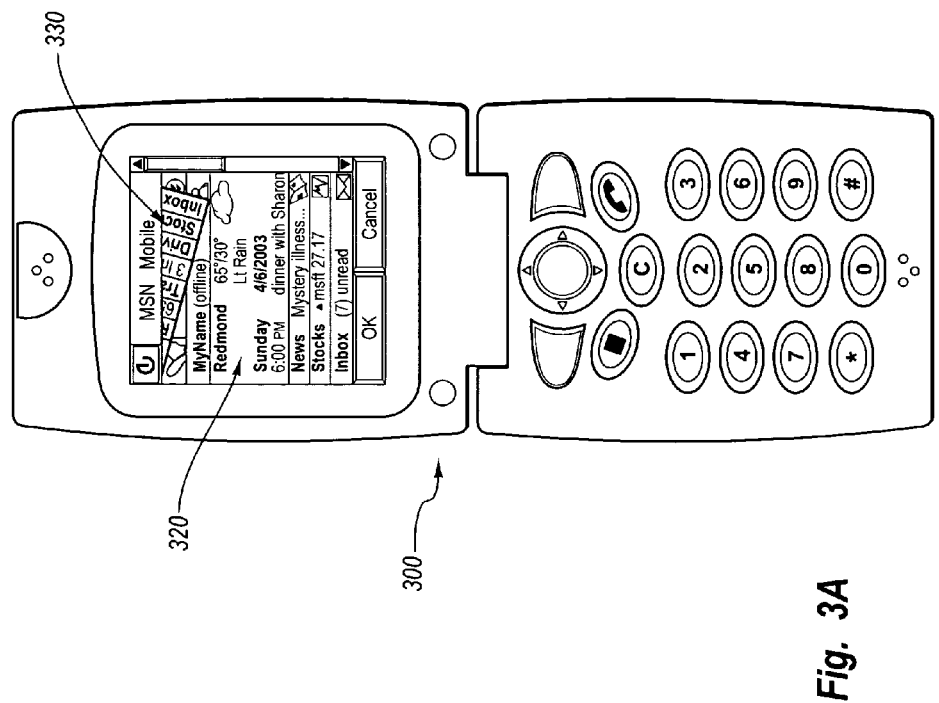
Figure 3A:
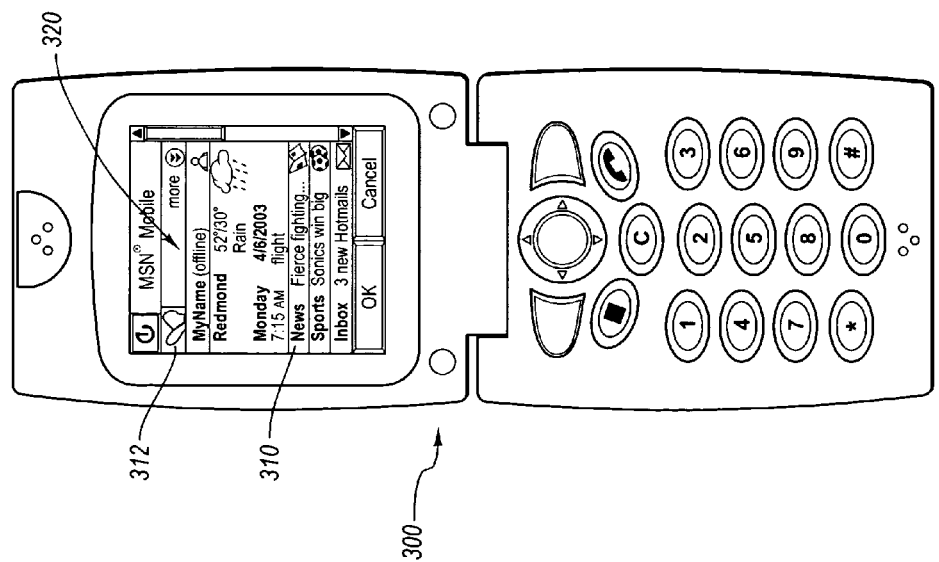

As shown in FIG. 3A the mobile communications device 300 has a display 310 that is being used to display information corresponding to a user's personal home lens 320. It will be appreciated that this personal home lens 320 can be created and modified by a user directly or by a third party in response to a user's profile, as described above. Likewise, the lens 320 can be presented and displayed automatically in response to the detection of particular presence information or in response to other factors, as described above.

In the illustrated embodiment, the personal lens 320 comprises an efficient display of basic information that is contextually relevant for a user based on their presence. As shown, the lens 320 includes an identifiable icon 312 that can visually identify the type of lens 320 that is being displayed to the user. The lens 320 also includes various other information, as described below. For example, the lens 320 includes a designation or name of the user (MyName) along with the status of the user (e.g., online or offline). The location of the user, Redmond, is also reflected along with the appropriate and relevant weather report for that city. The date and time is also reflected along with various news, sports and email links. According to the present embodiment, a user can obtain a more detailed display and information corresponding to a particular subject by selecting any of the corresponding links. For example, by selecting the News link, the user will be presented with a more complete and thorough listing of the news headlines.

If the user were to then travel to a new location, such as Newark, the change in presence is detected and used to obtain one or more new relevant lenses, as described above. For example if later in the week, say Sunday the user decides to fly to Newark, then the user's home lens can be replaced or modified by a new lens that is appropriate for Newark.

In particular, with reference to FIG. 3B, the user's home lens 320 has updated data at the time they left Redmond. It will also be noted that some of the information shown in FIG. 3A has been updated to reflect the current state of certain information. For example, the date, weather and time have been updated.

According to the present embodiment, upon arriving at the Newark airport, and upon turning the mobile communications device back on, assuming it was turned off during the flight, the new presence at Newark is detected and used to identify and obtain a new relevant travel lens for presentation to the user. FIG. 3B illustrates the new travel lens 330 as it is being placed over the existing home lens 320.

It will be appreciated that the travel lens 330 can display information that is contextually relevant for Newark, thereby replacing the information provided on the home lens 320. This is useful for eliminating the need for the user to look up information that has already been determined to be relevant or desired. Although the travel lens 330 could be displayed by itself, the embodiment in FIG. 3C illustrates how two lenses can be blended together. In particular, the travel lens 330 is shown to be displayed simultaneously with the home lens 320 in a blended format. The user can easily determine the lenses that are being utilized because of the icons that are displayed on the screen. In particular, the home lens icon 312 and the travel lens icon 332 indicate to the user which lenses are being blended. It will be appreciated that color patterns and other controllable features can be modified to enhance the user experience and improve the quality and distinguishing characteristics of different lenses.

It will also be appreciated that the presented information and format of the lenses can be modified to reflect any combination of merged lenses, which may, for example, z=include modifying of the lens frames, as shown in the blended home/travel lens 340. In particular, in the present embodiment, the city location and weather information have been truncated and joined into a single horizontal bar and in which the traffic report for the travel lens 330 has replaced the date and time bar of the home lens 320.

In certain embodiments, the manner in which the lenses are displayed and blended can be determined automatically. In other embodiments, menus or other tools can be used to enable a user to customize the lenses and how they are displayed. For example, with reference to FIG. 3D, a "more" menu 350 is expanded to reflect a number of possible lenses to display. In the present embodiment, only three lens options are available, a home or personal lens (e.g., lens 320), a travel or current location lens (e.g., lens 330) and a sports scores lens, although in other embodiments additional lenses can also be obtained and utilized.

Figure 3E:
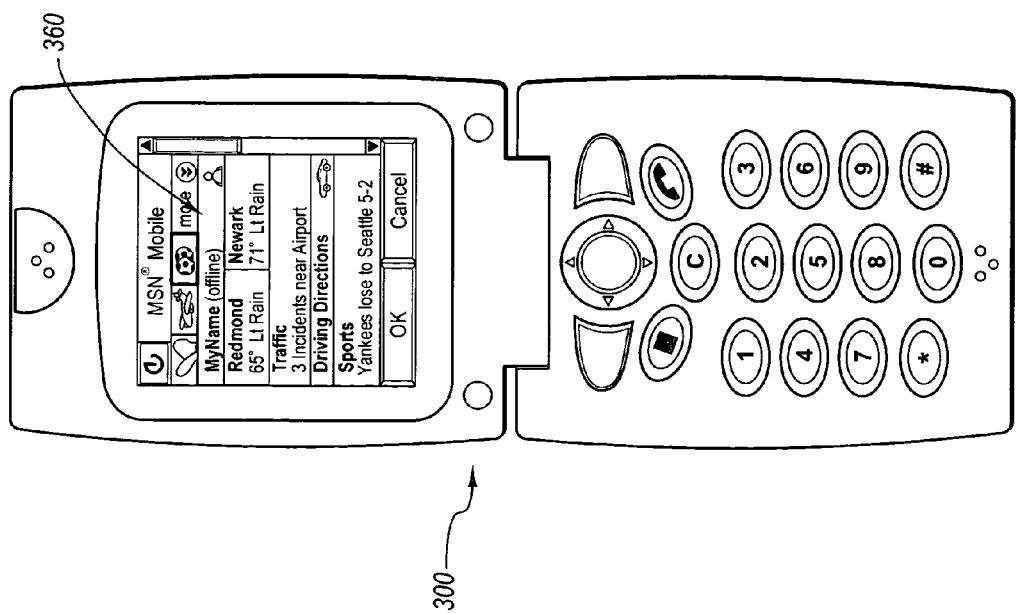

If a user wants to display any particular number of lenses then they can select the lenses that they want to display. In the present example, a user has selected all three lenses. Accordingly, when the lenses are displayed, they will be blended appropriately into a single blended lens 360, as shown in FIG. 3E. To facilitate the manner in which lenses are blended in a visually friendly format, different shades or colors can be used to correlate or correspond with the different lenses. For example, information corresponding to a home lens can have a blue background, information corresponding to a travel lens can have a beige background, and information corresponding to a sports lens can have a green background.

It will be appreciated, however, that the foregoing lens illustrations in FIGS. 3A-3D are merely illustrative and should not be construed as limiting the scope of the invention. Rather, the invention should more broadly be construed as applying to any types of templates or formats for displaying information as being contextually relevant to a user based on the user's presence, identity, and other status information. In other embodiments, the visual representation of the lenses can be modified by altering the patterns, images and textures of the lenses.

It will be appreciated that the invention, as it has been described, overcomes many of the problems known in the prior art with displaying information on mobile communications devices. In particular, the present invention enables a user to quickly and easily obtain relevant information in a user-friendly manner, based on predetermined usage profiles, and without requiring the user to waste the resources of their device to filter through undesired data.

Computing Environment

It will be appreciated by those skilled in the art that the invention may be practiced in computing systems and network computing environments with various configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 4:
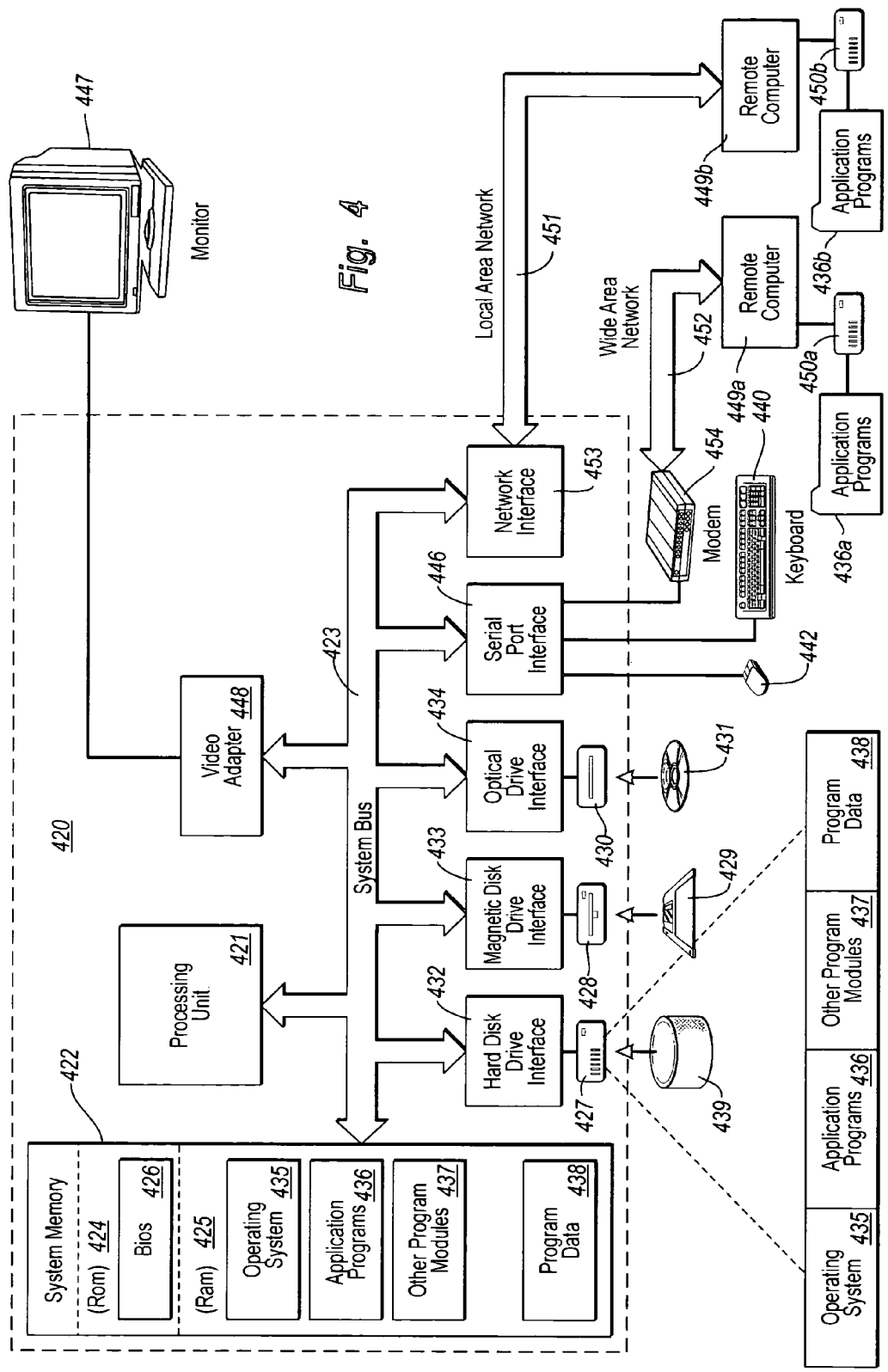
FIG. 4 illustrates one embodiment of a computing system that can be used to implement certain aspects of the invention.

With reference to FIG. 4, an exemplary system that can be used, for example to develop aggregate user preference data and to perform many of the other acts and steps of the invention is provided. The illustrated system includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM, DVD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of a server selecting a mobile device template that controls presentation of information to be delivered to a mobile user, based on an identification of a user and at least one of user preferences and usage data so as to deliver information that is contextually relevant to the user, the method comprising:

the server receiving information identifying a current physical location of a mobile device that is being used by a mobile user;

the server receiving identification of the mobile user from the mobile device;

the server retrieving a time indicator;

the server retrieving aggregate user preference data based on the received identification of the mobile user, wherein the aggregate user preference data corresponds to at least one of user preferences or prior usage data; and the server selecting at least one mobile device template for controlling the presentation of additional information at the mobile device, including a presentation format according to which the additional information is displayed, the at least one mobile device template being selected from a plurality of mobile device templates, wherein the selected at least one mobile device template is to be communicated to the mobile device of the mobile user based on determining which of the plurality of mobile device templates are relevant according to at least the aggregate user preference data and the identified current physical location of the mobile device, and such that the presentation format of the additional information is based on at least the aggregate user preference data and the current physical location of the mobile device, and wherein:

when the mobile device has a current physical location within a home geographic region, the selected at least one mobile device template includes a home mobile device template, said home mobile device template including a home icon graphically representing to the mobile user that the home mobile device template is being used when the home icon is displayed on the mobile device; and when the mobile device has a current physical location anywhere outside the home geographic region, the selected at least one mobile device template includes a traveling mobile device template, wherein the traveling mobile device template is configured to include content customized to any current physical location detected by the server to be outside the home geographic region, said traveling mobile device template including a traveling icon graphically representing to the mobile device.

2. The method of claim 1, further comprising rendering the information to be provided to the mobile user, and sending the rendered information to a mobile browser of a mobile communications device associated with the mobile user.

3. The method of claim 1, further comprising sending the information to a mobile carrier to be pushed to a mobile communications device associated with the mobile user.

4. The method of claim 2, wherein rendering the information is based at least in part on an identification of the mobile communications device.

5. The method of claim 1, further comprising:

the server retrieving a user profile associated with the mobile user;

wherein selecting the at least one mobile device template to be communicated to the user is further based on the user profile.

6. The method of claim 1, wherein selecting the at least one mobile device template to be communicated to the user is further based on the time indicator.

7. The method of claim 1, wherein receiving the identification of the mobile user includes receiving a PUID.

8. The method of claim 1, wherein receiving the identification of the mobile user includes receiving a PIN.

9. The method of claim 1, wherein receiving the identification of the mobile user is based on a MSISDN of the mobile device.

10. The method of claim 1, wherein the method further comprises:

the server detecting a change in a current physical location of the mobile device; and the server, in response to detecting the change, providing a new mobile device template to the mobile device, wherein the new mobile device template is used to present new information to the user at the mobile device according to a different presentation format.

11. The method of claim 1, wherein the at least one mobile device template comprises at least two mobile device templates.

12. The method of claim 1, wherein the aggregate user preference data includes at least computer usage data corresponding to a user's tracked usage on a device other than the mobile device.

13. The method of claim 11, wherein the at least two mobile device templates are blended to present the additional information at the mobile device.

14. The method as recited in claim 1, wherein the mobile device template to be communicated controls additional information other than advertising.

15. In a mobile communication system in which a server communicates with a mobile device, a computer program product comprising computer readable storage media having computer-executable instructions stored thereon for implementing the method of claim 1.

16. The method of claim 1, wherein the prior usage data comprises a composite of prior computer and telephone usage data.

17. The method of claim 1, further comprising, when the server detects the that the current physical location of the mobile device is outside the home geographic region, blending the home template with the travel template, wherein upon blending the home template with the travel template, each of the home icon and travel icon are configured to be displayed on the mobile device.

18. The method of claim 1, wherein the plurality of mobile device templates includes a sports scores template, the sports scores template being displayable upon selection by the mobile user.

* * * * *